United States Patent [19]
Qualtrough et al.

[11] 3,922,391

[45] Nov. 25, 1975

[54] PRODUCTION OF SHEET MATERIAL FOR USE AS GASKETS

[75] Inventors: John Geoffrey Qualtrough, Bolton; Harry Thornley; David John Adams, both of Rochdale, all of England

[73] Assignee: TBA Industrial Products Limited, Manchester, England

[22] Filed: Aug. 31, 1973

[21] Appl. No.: 393,321

Related U.S. Application Data

[63] Continuation of Ser. No. 197,448, Nov. 10, 1971, abandoned.

[30] Foreign Application Priority Data

Nov. 20, 1970 United Kingdom............... 55368/70

[52] U.S. Cl. ............... 427/174; 427/194; 427/195; 427/208; 427/211; 427/388
[51] Int. Cl.² .......................................... B29C 17/02
[58] Field of Search.......... 117/132 LB, 133, 132 R, 117/2, 68, 111 H, 75,

[56] References Cited
UNITED STATES PATENTS

| | | | |
|---|---|---|---|
| 2,957,784 | 10/1960 | Schiefelbein........................... | 117/75 |
| 3,013,926 | 12/1961 | Railsback et al. ............. | 117/132 CB |
| 3,132,040 | 5/1964 | Charles et al........................... | 117/68 |
| 3,159,516 | 12/1964 | Harris ...................... | 156/292 |
| 3,264,132 | 8/1966 | Merrill et al..................... | 117/111 R |
| 3,400,009 | 9/1968 | McDermott et al.......... | 117/132 CB |
| 3,429,727 | 2/1969 | Hochberg .............. | 117/68 |
| 3,453,164 | 7/1969 | Gursky et al. .......... | 117/68 |
| 3,537,915 | 11/1970 | Becker......................... | 117/132 CB |

*Primary Examiner*—William R. Trenor
*Attorney, Agent, or Firm*—Brisebois & Kruger

[57] ABSTRACT

A process for producing in indefinitely long lengths composite sheet material consisting of a metal core coated on both sides with a fibre reinforced elastomeric material comprises coating both sides of the core with an adhesive; applying the elastomeric coatings to both sides of the core simultaneously by drawing the core through a nip between two rotating calender rolls by means of a tensioning device which acts on the core downstream of the calender rolls, feeding an uncured doughlike composition of fibre-reinforced elastomeric material, containing a solvent system including a volatile solvent for the elastomer and a non-solvent liquid which prevents adhesion of the composition to the rolls, to both sides of the core as it passes through the nip, the feeding and viscosity of the dough-like composition being controlled so that coatings of the composition are spread evenly over both sides of the core; and subsequently curing the coatings.

14 Claims, 2 Drawing Figures

PRODUCTION OF SHEET MATERIAL FOR USE AS GASKETS

This is a continuation, of application Ser. No. 197,448, filed Nov. 10, 1971, now abandoned.

A composite sheet material commonly used for making gaskets, for example, for the cylinder heads of internal combustion engines comprises surface coatings of fibre reinforced elastomer bonded to both faces of a metal core. In one conventional method of making such materials the coatings are formed separately and are subsequently bonded to the metal core in a separate operation.

Very considerable advantages would be obtained if the conventional fibre reinforced elastomer could be formed into sheets and bonded to a strip of the metal core of an infinitely long length by a continuous process.

In our copending U.S. patent application Ser. No. 393,774 we have described a process for producing such composite sheet material in indefinitely long lengths. However, in our prior process, a curable dough-like fibre reinforced elastomer composition is formed into a sheet and bonded to one face of the metal core by feeding the metal core and on one face of the metal core the dough-like composition through a nip between two calender rolls to spread the composition over the metal core and bond it thereto to form one coating and subsequently a second coating is applied in a similar manner to the other face of the metal core by passing the metal core with its first coating, which has previously been dried, through a second nip between two further calender rolls. Both the pairs of calender rolls are positively driven and as the core passes through the nip between the first pair of rolls, one of the rolls is in contact with the dough-like composition and the other with the metal core. The metal core and the dough-like composition are drawn through the nip by the frictional engagement of the metal core with the latter roll. As a result the metal passes through the nip at the same surface speed as that of the calender rolls and a smooth uniform facing is applied to one side of the metal. In the passage through the nip between the second pair of rolls, one of the second pair of rolls is in contact with the dough and the other with the dried coating on the core. In this case the coated core and the dough-like composition are drawn through the nip by the frictional engagement of the dried coating with the second roll. Again therefore the coated metal core passes through the nip at the same surface speed as that of the calender rolls and a second smooth uniform facing is applied to the other side of the metal core.

It is clearly desirable to coat both faces of the metal core simultaneously and thus reduce the total time or equipment required for the production process. However, if the dough-like composition is fed to both sides of the metal core as it passes through the nip of a single pair of calender rolls, the rolls do not grip the wet dough-like composition so that either the core does not move through the nip and no coating is formed at all or, if any movement is imparted to the metal core, it is irregular and the coatings formed are totally unacceptable.

In accordance with the present invention, composite sheet material comprising a metal core coated on both sides with a fibre reinforced elastomeric material is produced in indefinitely long lengths and the coatings are applied to both sides of the metal core simultaneously by drawing the core through a nip between two rotating calender rolls by means of a tensioning device which acts on the core downstream of the calender rolls, the core being drawn at a speed equal to the surface speed of the calender rolls, feeding an uncured dough-like composition of fibre-reinforced elastomeric material to both sides of the core as it passes through the nip, the feeding and viscosity of the dough-like composition being controlled so that coatings of the dough-like material are spread evenly over both sides of the core, and subsequently curing the coatings.

Accordingly the calender rolls act solely to smooth the dough-like composition onto the metal core and do not have to apply any traction to the core itself.

To prevent differences in speed between the metal and the surface of the calender rolls, high tension has to be applied to the metal core and accordingly if the tension is applied by the application of drive rolls or other gripping devices whilst the coatings formed on the two sides of the metal core are still wet these may easily be damaged. To avoid this damage, the coated metal core is preferably first passed through an oven so that the coatings are dried before they are engaged by the tensioning device.

After the two coatings have been dried, the core with its two coatings is preferably passed through a further nip between two calender rolls to consolidate the coatings and enhance the bonding of the coatings to the core before the coatings are cured.

Preferably also, the dough-like fibre-reinforced elastomeric material contains a solvent system including a volatile solvent for the elastomer and a non-solvent liquid. The volatile solvent is required in the solvent system to render the composition plastic so that it can be spread by the calender rolls as an even coating over the surface of the metal core and the non-solvent liquid. liquid prevents adhesion of the dough-like composition to the calender rolls.

Preferably the coated core passes round an arc of the periphery of one of the calender rolls after it has passed through the nip of the calender rolls at which the coatings are applied and then, after the coatings have been dried, the coated core passes around and between two or more capstan driving rolls which form the tensioning device which applies tension to the coated core and draws the core through the calender rolls at a speed equal to the surface speed of the calender rolls.

After this, the coated core may pass back through the drying oven to remove any remaining traces of the volatile solvent in the dough-like composition and it then passes between the further pair of calender rolls which consolidate the coatings and finally it passes through a curing oven.

Preferably the fibre in the composition is asbestos, the volatile solvent is a liquid hydrocarbon, for example toluene, and the non-solvent liquid is water. When the volatile solvent is toluene and the non-solvent liquid is water, the ratio of toluene to water in the solvent system is preferably greater than 4 to 1 and less than 10 to 1 by volume. The metal core may be of woven wire gauze and in this case the dough-like composition will bond readily to the core by direct contact as some of the composition penetrates the interstices of the gauze. Similar conditions apply if the metal core is a perforated sheet. Preferably, however, the metal core is a plain or an embossed sheet and in this case, to assist in bonding the dough-like composition to the metal core, the core is preferably coated with an adhesive on both faces before the dough-like composition is applied to it. When an adhesive is used, it preferably comprises a curable adhesive material in solution in a solvent and when it has been applied to the metal, the solvent is evaporated to leave a thin film of at least 5 microns thick of flexible heat-curable adhesive on both sides of the metal core. Subsequently, when the dough-like composition and the core are drawn through the nip between the two calender rolls, the composition comes into contact with the uncured adhesive. The adhesive is preferably partly soluble in the solvent system in the composition. The result is that the adhesive is not completely dissolved, but nevertheless the solvent in the dough-like composition takes some adhesive into solution and so causes mixing of the adhesive and the curable elastomeric constituent of the dough-like composition. This ensures that there is an effective bond between the coatings of fibre reinforced elastomer and the metal core after the elastomeric composition and the adhesive have been cured.

Preferably the adhesive is a solution of nitrile rubber and a phenolic resin, which is easily soluble in a polar solvent such as ethyl acetate, but which is only partly soluble in toluene. The use of the phenolic resin presents the advantage that it will adhere to the metal, but by itself is brittle. This brittleness is largely removed by the mixture with it of the nitrile rubber.

When the dough-like composition and the dried adhesive film are pressed together on passage through the calender rolls, the toluene in the composition takes some of the adhesive into solution creating a tacky surface to which the dough-like composition preferably adheres. The toluene is subsequently evaporated and then the curable dough-like composition is firmly bonded to the adhesive which in turn is firmly bonded to the metal. The subsequent consolidation of the coating of dough-like composition enhances the bond still further and prevents subsequent delamination of the composite sheet material in service.

When toluene and water form the solvent system, the adhesive is soluble to different extents in the solvent system in accordance with the ratio of toluene and water in it. The limits of the ratio of toluene and water already set out, within which efficient release of the coating of dough-like composition from the calender roll is obtained, have been found to be satisfactory, with respect to the solubility of the adhesive in the solvent system.

By feeding uncured dough-like compositions of the same viscosity to the two sides of the core, coatings of equal thicknesses are produced on the two sides. Alternatively, by feeding compositions of different viscosities to the two sides of the core, coatings of different thicknesses are produced. Of course, the side to which the composition of greater viscosity is fed is provided with the coating of greater thickness.

An example of a process in accordance with the invention will now be described with reference to the accompanying diagrammatic drawings, in which.

Figure 1:
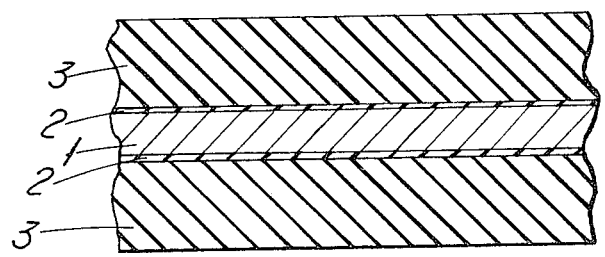
FIG. 1 is a section through a small piece of the composite sheet material.

As shown in FIG. 1, the composite sheet material comprises a metal core 1 having on each side a coating comprising a film of adhesive 2 and a layer of fibre reinforced elastomeric material 3.

Figure 2:
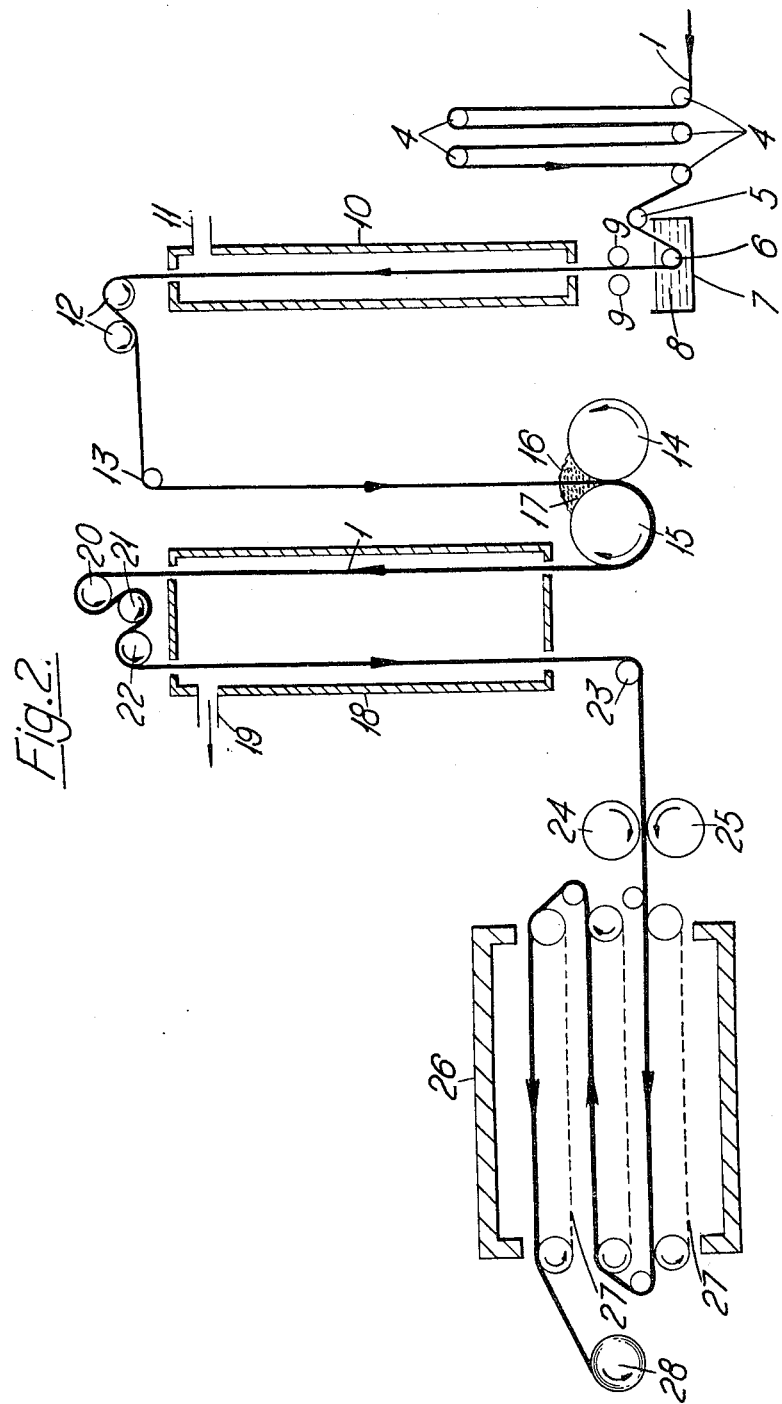
FIG. 2 is a diagrammatic illustration of one example of the apparatus used in carrying out the process.

The composite sheet material is made as follows in the apparatus illustrated diagrammatically in FIG. 2:

An indefinitely long strip of the metal core 1, which in this example is plain tin plate steel is drawn from a roll which is not shown and extends to and fro under and over a series of guide rollers 4 which together form a festoon. From the last of the rollers 4, the core 1 extends over a guide roller 5 and then under a guide roller 6 which is submerged in a tank 7 holding a bath of liquid adhesive 8.

From the tank 7, the core 1 extends upwards between a pair of fixed metering bars 9 which control the thickness of the layer adhesive applied to the two sides of the core 1 in its passage through the bath 8. After this the core passes through a solvent extraction tower 10 in which the solvent from the adhesive film is removed and sucked out through an outlet 11.

At the top of the solvent extraction tower 10, the core 1 passes partly around a pair of contra-rotating capstan drive rollers 12 by which the core 1 is drawn from its supply roll through the festoon and then through the adhesive bath 8. From the second of the two capstan drive rollers 12, the core 1 with its dried adhesive coating passes over a guide roller 13 and thence vertically downwards through a nip formed between a pair of driven calender rolls 14 and 15. Masses of dough-like fibre reinforced elastomeric material 16 and 17 are maintained at the nip between the core 1 and the surfaces of the calender rolls 14 and 15 respectively. In this example, the dough-like elastomeric material is supplied manually with a shovel to the nip, but it may alternatively be metered from a hopper. The exact rate of supply is not important provided that a mass of the composition is maintained between each of the calender rolls and the core 1. The elastomeric material contains curing agents, fillers and a solvent system including toluene and water. In this example, the viscosities of the two masses 16 and 17 of elastomeric material are the same as each other.

The core 1 passes around the lower half of the periphery of the calender roll 15 and then extends upwards through a drying tower 18 which is heated to evaporate the volatile solvent from the two coatings of elastomeric material applied to the core 1. The solvent is sucked out through an outlet 19 from the drying tower 18 and passes to a solvent recovery system.

The core 1 carrying its two coatings of elastomeric material which are now dried passes in a tortuous path around three capstan drive rolls 20, 21 and 22 which are positively rotated in the directions of the arrows shown on them. Because of the tortuous path of the coated core around the rolls 20 to 22, the frictional grip of the rolls on the coated core is very considerable and thus the capstan drive rolls are able to apply a very powerful tension to the core 1 by means of their frictional drag on the two coatings, but because of the substantial area over which the frictional drag is distributed, the coatings themselves which are dried, are not damaged.

Because of the tension applied to the core 1 by the capstan drive rolls 20 to 22, the core 1 is positively pulled through the nip between the calender rolls 14 and 15 and these calender rolls do not themselves have to propel the core 1 at all, since the speed at which the core 1 is drawn through the nip is equal to the peripheral speed of the rolls 14 and 15. The function of the rolls 14 and 15 is therefore solely to act as spreaders to spread the dough-like elastomeric material 16 and 17 as even coatings over the two faces of the core 1 as it passes through the nip between the rolls. Since in this example, the elastomeric material 16 and 17 is all of the same viscosity, coatings of equal thicknesses are applied to the two faces of the core 1 and the thickness of these two coatings is determined by the width of the gap between the rolls 14 and 15, the thickness of the core 1 and the thicknesses of the films of adhesive already applied to the core 1 following its passage through the adhesive bath 8 and the metering bars 9.

From the capstan drive rolls 20 to 22, the core 1 with its two coatings passes downwards again through the drying tower 18 and thence under a guide roll 23 to the nip between two further calender rolls 24 and 25. The gap between the rolls 24 and 25 is slightly less than the overall thickness of the core 1 together with its coatings of adhesive and elastomeric material so that both coatings of elastomeric material are consolidated and the bonding of these coatings initially effected by the calender rolls 14 and 15 is enhanced.

Finally the core 1 with its consolidated coatings passes through an oven 26 containing three endless conveyor belts 27 by which the core 1 with its coatings is moved to and fro through the oven. The oven 26 is heated to a higher temperature than the drying tower 18 and the temperature is such that it cures the elastomeric material in the two coatings and the adhesive to form the final composite sheet material which passes from the curing oven 26 and is wound onto a coiling mandrel 28.

In this example, the materials used in the process in the apparatus as just described are as follows:

Firstly, to prepare the dough-like composition 16 and 17, rubber, accelerators and curing agents are mixed in a Banbury mixer to form a rubber compound. The rubber compound is steeped for 16 hours at room temperature in toluene and is then homogenised in a twin sigma blade mixer to form a rubber dough. The rubber dough, asbestos fibre and filler are then mixed together in a spike mixer to form the fibre reinforced dough-like composition. Towards the end of the mixing cycle, the non-solvent liquid, which is a solution of sodium carbonate in water is added to the mix. The mix is finally extruded and pelletised through a conventional mincing machine. The following formulation is a typical example expressed in parts per 100 parts by weight of asbestos fibre:

| Rubber Compound | |
| --- | --- |
| Styrene Butadiene Rubber (S.B.R. 1509) | 25.000 |
| Zinc Oxide | 1.250 |
| H.A.F. Carbon Black | 10.000 |
| Stearic Acid | 0.125 |
| Tetramethylthiuram disulphide | 0.500 |
| N-cyclohexyl benzthiazole - 2 - sulphenamide | 0.250 |
| Sulphur | 0.125 |
| Total Rubber Compound | 37.250 |
| Rubber Dough | |
| Rubber Compound | 37.250 |
| Toluene | 71.920 |
| Total Rubber Dough | 109.170 |
| Fibre Reinforced Composition | |
| Rubber dough | 109.170 |
| Asbestos Fibre (Cassiar AY.120) | 100.000 |
| Filler | 28.583 |
| Sodium Carbonate | 0.833 |
| Water | 10.000 |

The metal core is plain tin plate steel 0.006 inches thick and 18 inches wide. As the core is plain metal sheeting, coating with an adhesive is necessary and the adhesive used is a nitrile rubber/modified phenolic resin adhesive known by the Trade Name National Adhesive 1366318. The adhesive is diluted 1:1 with ethyl acetate to give a concentration of 13% by weight of solids.

The metering bars are set to give a dry adhesive film thickness of 5 microns and the metal core is passed through the apparatus at a speed of 20 feet per minute, which is also the surface speed of the calender rolls all of which are 30 inches in diameter. The gap between the rolls 14 and 15 is 0.034 inches and that between the rolls 24 and 25 is 0.030 inches. The effective length of the drying tower 18 and of the oven 26 is such that the dwell time of the coated core in both the tower and in the oven is 3 minutes. The drying tower 18 operates at a temperature of 110°C and the oven 26 at a temperature of 150°C.

The purpose of the oven 26 is to convert the elastomeric material in the dough-like composition from a plastic material which will flow under pressure to an elastic material which is resistant to flow. It is only when the elastomeric material is in the cross-linked state that the desired properties of the finished composite sheet material are obtained.

We claim:

1. A process for producing in indefinitely long lengths composite sheet material comprising a metal core having a fibre-reinforced elastomer permanently secured to both sides thereof, said process comprising the steps of compounding a curable dough from fibre, elastomer, curatives and a solvent system including a volatile solvent for the elastomer and a liquid which is a non-solvent for said elastomer, pelletizing, said curable dough, coating both sides of the core with an adhesive capable of being tackified by the solvent for the elastomer, then drawing the metal core through a nip between two calender rolls by means of a tensioning device acting on the core downstream of said nip to draw the core at a speed equal to the surface speed of the calender rolls, feeding pellets of said curable dough simultaneously to both sides of said core as it enters said nip, with said non-solvent liquid serving to prevent adhesion of the dough to the rolls, while controlling the feed and viscosity of the curable dough so that coatings of said dough are spread evenly over both sides of the core, drying said coatings prior to the tensioning device, and subsequently curing the coatings.

2. A process according to claim 1 in which the metal core is a plain sheet.

3. A process according to claim 1, in which the metal core is a perforated sheet.

4. A process according to claim 1, in which the metal core is an embossed sheet.

5. A process according to claim 1, in which the metal core is of woven wire gauze or expanded metal.

6. A process according to claim 1, in which the adhesive is a mixture of nitrile rubber and a phenolic resin.

7. A process according to claim 1, in which the adhesive is in a film at least 5 microns thick.

8. A process according to claim 1, in which dough-like compositions of different viscosities are fed to the two sides of the core so that coatings of different thicknesses are produced on the two sides.

9. A process according to claim 1, in which the coatings are consolidated by passing the coated core between a further pair of calender rolls before curing the composition by further heating.

10. A process according to claim 1, in which the fibre is asbestos.

11. A process according to claim 10, in which the volatile solvent is a liquid hydrocarbon.

12. A process according to claim 11, in which the hydrocarbon is toluene.

13. A process according to claim 1, in which the non-solvent liquid is water.

14. A process according to claim 13, in which said solvent is toluene and in which the ratio of toluene to water in the solvent system is greater than 4 to 1 and less than 10 to 1 by volume.

* * * * *